(12) United States Patent
Suzuki et al.

(10) Patent No.: US 11,549,522 B2
(45) Date of Patent: Jan. 10, 2023

(54) EJECTOR

(71) Applicant: DENSO CORPORATION, Kariya (JP)

(72) Inventors: Tatsuhiro Suzuki, Kariya (JP); Gota Ogata, Kariya (JP); Yoichiro Kawamoto, Kariya (JP); Ryu Fukushima, Kariya (JP)

(73) Assignee: DENSO CORPORATION, Kariya (JP)

(*) Notice: Subject to any disclaimer, the term of this patent is extended or adjusted under 35 U.S.C. 154(b) by 843 days.

(21) Appl. No.: 16/452,758

(22) Filed: Jun. 26, 2019

(65) Prior Publication Data

US 2019/0338790 A1 Nov. 7, 2019

Related U.S. Application Data

(63) Continuation of application No. PCT/JP2018/001844, filed on Jan. 23, 2018.

(30) Foreign Application Priority Data

| Jan. 26, 2017 | (JP) | ............................ JP2017-011964 |
| Dec. 13, 2017 | (JP) | ............................ JP2017-238514 |

(51) Int. Cl.
  *F04F 5/04* (2006.01)
  *F04F 5/46* (2006.01)
  *B60H 1/32* (2006.01)

(52) U.S. Cl.
  CPC .................. *F04F 5/04* (2013.01); *F04F 5/46* (2013.01); *B60H 2001/3298* (2013.01)

(58) Field of Classification Search
  CPC ........ F04F 5/04; F04F 5/46; F04F 5/16; F04F 5/461; F25B 41/00; F25B 41/35; B60H 2001/3298; B60H 2341/0012

(Continued)

(56) References Cited

U.S. PATENT DOCUMENTS

| 9,285,146 B2 | 3/2016 | Liu et al. |
| 2004/0089019 A1 | 5/2004 | Kawamura et al. |

(Continued)

FOREIGN PATENT DOCUMENTS

| CN | 103270379 A | 8/2013 |
| JP | 2004144043 A | 5/2004 |

(Continued)

*Primary Examiner* — Alexander B Comley
(74) *Attorney, Agent, or Firm* — Harness, Dickey & Pierce, P.L.C.

(57) ABSTRACT

An ejector includes a nozzle, a needle and a body. The nozzle reduces a pressure of a fluid and discharges the fluid as an injected fluid from a fluid injection port. The body includes a fluid suction port and a pressure increasing portion. The fluid suction port draws, as a suction fluid, a fluid from an outside of the body by using a suction force generated by the injected fluid. The pressure increasing portion increases a pressure of a mixture of the injected fluid and the suction fluid. The nozzle includes a throat portion and a nozzle-side tapered portion. The throat portion reduces a passage cross-sectional area of the fluid passage to be smallest in the fluid passage at the throat portion. The nozzle-side tapered portion expands the passage cross-sectional area of the fluid passage toward the downstream side in the flow direction of the fluid. In an axial cross section, an injection-flow spread angle formed on the downstream side in the flow direction of the fluid between a central axis and a tangent line of an injection-flow center line at the fluid injection port is 0° or greater.

4 Claims, 7 Drawing Sheets

(58) Field of Classification Search
USPC .......................................................... 417/198
See application file for complete search history.

(56) References Cited

U.S. PATENT DOCUMENTS

| | | |
|---|---|---|
| 2004/0172966 A1 | 9/2004 | Ozaki et al. |
| 2009/0229304 A1 | 9/2009 | Ogata et al. |
| 2011/0061423 A1 | 3/2011 | Ogata et al. |
| 2012/0318894 A1 | 12/2012 | Ogata et al. |
| 2013/0277448 A1 | 10/2013 | Liu et al. |
| 2016/0195316 A1* | 7/2016 | Liu .................... F04F 5/461 239/417.5 |
| 2018/0045225 A1 | 2/2018 | Yokoyama et al. |

FOREIGN PATENT DOCUMENTS

| | | | |
|---|---|---|---|
| JP | 2004270460 A | | 9/2004 |
| JP | 2007170725 A | * | 7/2007 |
| JP | 2009221883 A | | 10/2009 |
| JP | 2011058422 A | | 3/2011 |
| JP | 2014206147 A | | 10/2014 |
| JP | 2016169729 A | | 9/2016 |
| WO | WO-2002001970 A2 | | 1/2002 |

* cited by examiner

EJECTOR

CROSS REFERENCE TO RELATED APPLICATIONS

This application is a continuation application of international Patent Application No. PCT/JP2018/001844 filed on Jan. 23, 2018, which designated the United States and claims the benefit of priority from Japanese Patent Application No. 2017-011964 filed on Jan. 26, 2017 and Japanese Patent Application No. 2017-238514 filed on Dec. 13, 2017. The entire disclosures of all of the above applications are incorporated herein by reference.

TECHNICAL FIELD

The present disclosure relates to an ejector that discharges, as an injection fluid, a fluid from a nozzle at a high speed and that draws a fluid using a suction force generated by the injected fluid.

BACKGROUND ART

Ejectors may include a nozzle, a pressure increasing portion (or a diffuser portion), and a fluid suction port. The nozzle discharges a fluid at a high speed as an injected fluid. The injected fluid generates suction force in the ejector. The fluid suction port draws, as a suction refrigerant, a fluid using the suction force generated by the injected fluid. The pressure increasing portion increases a mixture of the injected fluid and the suction fluid.

SUMMARY OF THE INVENTION

An ejector includes a nozzle, a needle, and a body. The nozzle reduces a pressure of a fluid in a liquid phase or a fluid in a gas-liquid two-phase and discharges, as an injected fluid, the fluid in the liquid phase or the fluid in the gas-liquid two phase at a high speed from a fluid injection port. The needle is disposed in a fluid passage defined in the nozzle and extends along a central axis of the nozzle. The body includes a fluid suction port and a pressure increasing portion. The fluid suction port draws, as a suction fluid, a fluid from an outside of the body by using a suction force generated by the injected fluid. The pressure increasing portion increases a pressure of a mixture of the injected fluid and the suction fluid. The needle includes a tip portion that protrudes from the fluid injection port toward a downstream side of the fluid injection port along a flow direction of the fluid. The nozzle includes a throat portion and a nozzle-side tapered portion. The throat portion reduces a passage cross-sectional area of the fluid passage to be smallest in the fluid passage at the throat portion. The nozzle-side tapered portion extends from the throat portion to the fluid injection port and expands the passage cross-sectional area of the fluid passage toward the downstream side in the flow direction of the fluid. The needle is configured to close the fluid passage. In an axial cross-section of the ejector along with the central axis extends, lines perpendicular to the central axis are defined as virtual vertical lines. Points at which the virtual vertical lines intersect with an outer surface of the needle are defined as needle-side intersection points. Points at which the virtual vertical lines intersect with an inner surface of the nozzle-side tapered portion are defined as nozzle-side intersection points. Middle points between the needle-side intersection points and the nozzle-side intersection points on the virtual vertical lines are defined as midpoints. A line passing through the midpoints is defined as an injection-flow center line. In the axial cross section, an injection-flow spread angle formed on the downstream side in the flow direction of the fluid between the central axis and a tangent line of the injection-flow center line at the fluid injection port is 0° or greater.

BRIEF DESCRIPTION OF DRAWINGS

The above and other objects, features and advantages of the present disclosure will become more apparent from the following detailed description made with reference to the accompanying drawings.

DESCRIPTION OF EMBODIMENTS

Ejectors may include a so-called plug nozzle in which a needle extending along a central axis of the nozzle is disposed in a fluid passage of the nozzle, and a tip portion of the needle protrudes from a refrigerant injection port of the nozzle toward a downstream side in the flow direction of the fluid. In the plug nozzle of the above type, the injected fluid ejected from the fluid injection port can be freely expanded to accelerate a flow speed of the injected fluid to be equal to or higher than a sound speed.

However, in the plug nozzle, the injected fluid may be attracted to the tip portion of the needle due to Coanda effect or the like, and the injected fluid hardly spreads outward away from the central axis. Further, the suction fluid, which is drawn from the fluid suction port, is intended to join the injected fluid, which flows out of the fluid injection port, from an outside of the fluid injection port.

As such, an efficiency in mixing the injected fluid and the mixture of the injected fluid and the suction fluid would deteriorate. As a result, an energy conversion efficiency (ejector efficiency hereinafter) of the ejector as a whole would deteriorate. Thus, the ejector may not draw the fluid effectively and may not increase a pressure of the fluid sufficiently.

First Embodiment

Figure 1:
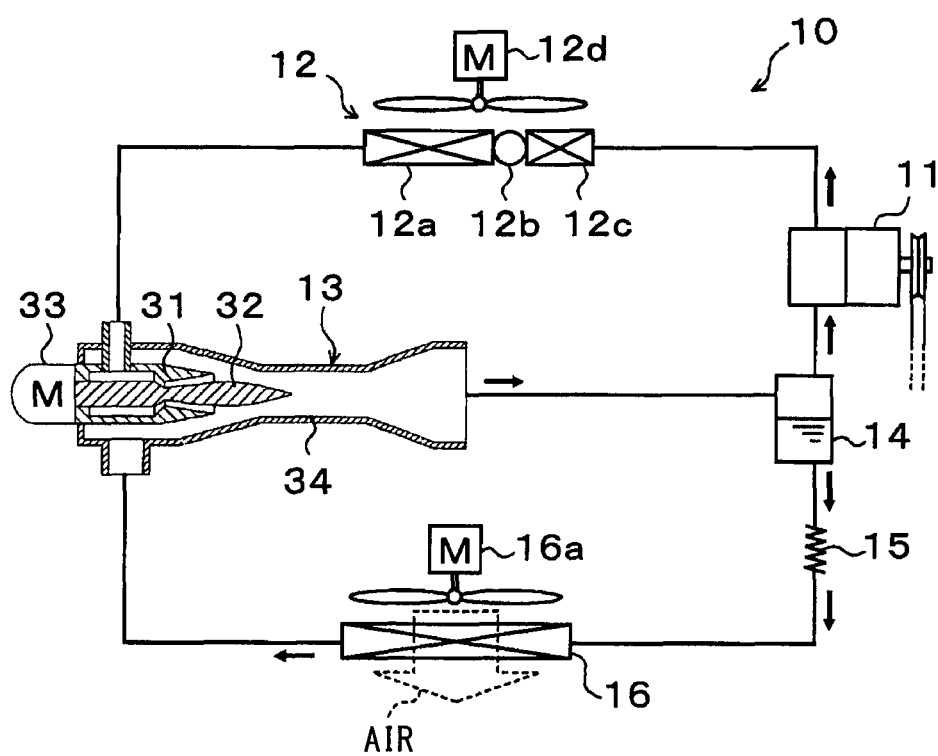
FIG. 1 is an overall configuration diagram of an ejector refrigeration circuit according to a first embodiment.

A first embodiment of the present embodiment will be described with reference to FIGS. 1 to 4. As shown in FIG. 1, an ejector 13 according to the present embodiment is applied to an ejector refrigeration circuit 10 which is a vapor compression type refrigeration cycle device including an ejector. Further, the ejector refrigeration circuit 10 is applied to a vehicle air conditioner, and cools an air blown into a vehicle compartment, which is a space to be air conditioned.

Therefore, a cooling target fluid of the ejector refrigeration circuit 10 according to the present embodiment is an air that is blown into the vehicle compartment. As an example, the fluid may be a refrigerant circulating in the ejector refrigeration circuit 10. As such, the ejector 13 discharges the refrigerant, draws the refrigerant, and increases a pressure of the refrigerant.

In the ejector refrigeration circuit 10, an HFC based refrigerant (specifically, R134a) is employed as the refrigerant, and a subcritical refrigeration cycle is configured in which a high-pressure side refrigerant pressure does not exceed a critical pressure of the refrigerant. A refrigerator oil for lubricating a compressor 11 is mixed in the refrigerant, and a part of the refrigerator oil circulates in the cycle together with the refrigerant.

Among the components of the ejector refrigeration circuit 10, the compressor 11 suctions the refrigerant, increases the pressure of the refrigerant until the refrigerant becomes a high-pressure refrigerant, and discharges the refrigerant. The compressor 11 is disposed in an engine compartment together with an engine (internal combustion engine) for outputting a driving force for vehicle travelling. Further, the compressor 11 is an engine driven compressor driven by a rotational driving force output from the engine through a pulley, a belt, or the like.

More specifically, according to the present embodiment, as the compressor 11, a swash plate type variable capacity type compressor configured to be able to adjust the refrigerant discharge capacity by changing the discharge capacity is adopted. The compressor 11 has a discharge capacity control valve (not shown) for changing the discharge capacity. The operation of the discharge capacity control valve is controlled according to a control current output from a control device to be described later.

A refrigerant inlet side of a condensing portion 12a of a heat radiator 12 is connected to a discharge port of the compressor 11. The radiator 12 is a radiation heat exchanger that performs a heat exchange between a high-pressure refrigerant discharged from the compressor 11 and a vehicle exterior air (outside air) blown by a cooling fan 12d to radiate the heat from the high-pressure refrigerant and cool the high-pressure refrigerant. The radiator 12 is disposed on a front side of the vehicle in the engine compartment.

More specifically, the radiator 12 is configured as a so-called subcooling condenser having a condensing portion 12a, a receiver portion 12b, and a subcooling unit 12c.

The condensing portion 12a is a condensation heat exchanging unit that performs the heat exchange between the high-pressure gas-phase refrigerant discharged from the compressor 11 and the outside air blown from the cooling fan 12d and radiates and condenses the high-pressure gas-phase refrigerant. The receiver portion 12b a refrigerant container that separates gas and liquid of a refrigerant that has flowed out from the condensing portion 12a, and accumulates an excess liquid-phase refrigerant. The subcooling unit 12c is a heat exchanging unit that performs the heat exchange between a liquid-phase refrigerant that has flowed out of the receiver portion 12b and the outside air blown from the cooling fan 12d, and super-cools the liquid-phase refrigerant.

The cooling fan 12d is an electric blower, a rotating speed (that is, blown air amount) of which is controlled according to a control voltage output from the control device. A refrigerant inlet 31a of the nozzle 31 in the ejector 13 is connected to a refrigerant outlet side of the subcooling unit 12c of the radiator 12.

The ejector 13 functions as a refrigerant pressure reducing device for reducing the pressure of the subcooling state high-pressure liquid-phase refrigerant flowing out of the radiator 12. Further, the ejector 13 functions as a refrigerant transport device that draws and transports the refrigerant that has flowed out of an evaporator 16, which will be described later, by the suction action of the injected refrigerant ejected at a high speed.

Figure 2:
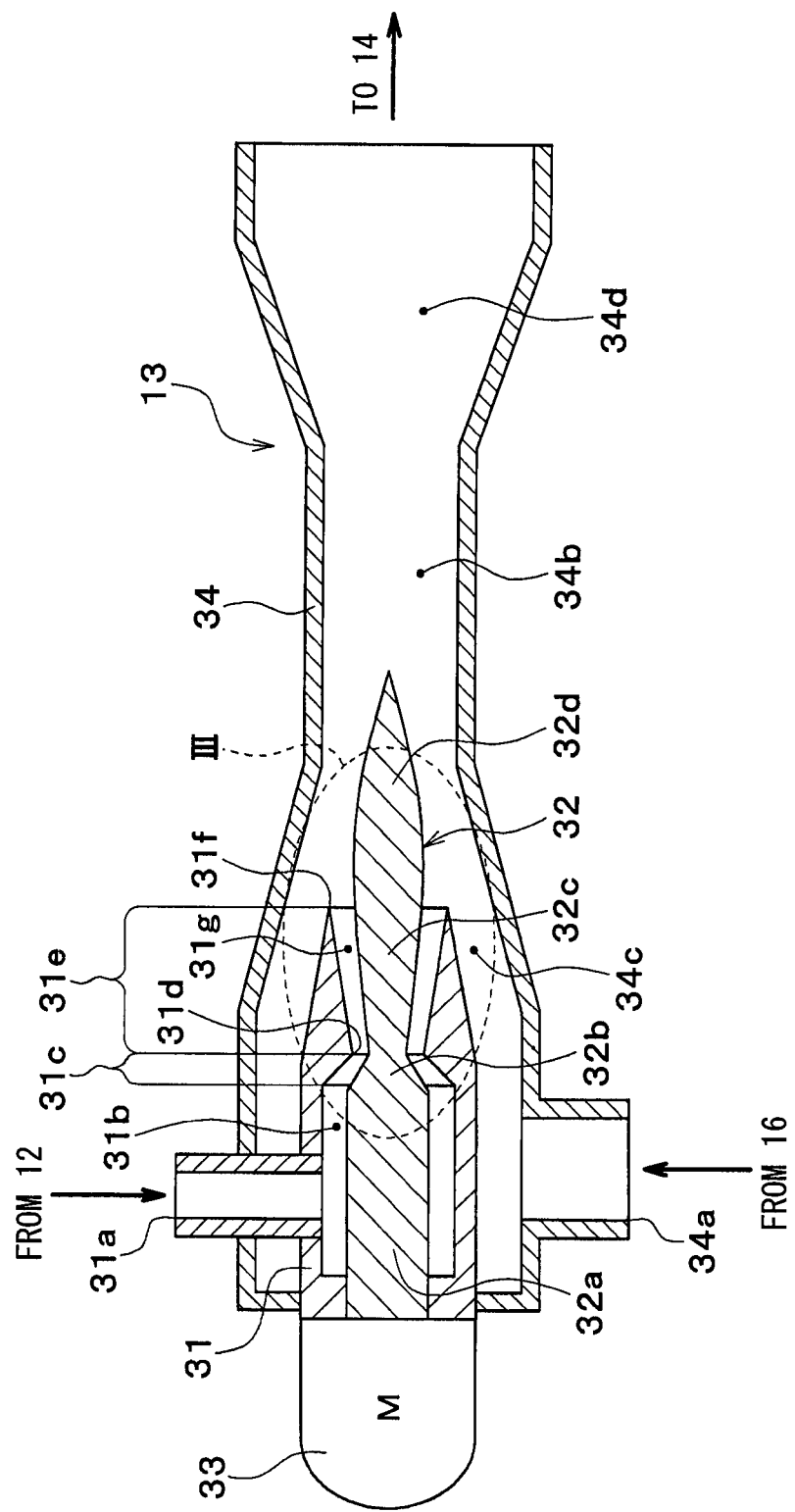
FIG. 2 is an axial cross sectional view of an ejector according to the first embodiment.

The detailed configuration of the ejector 13 will be described with reference to FIGS. 2 and 3. The ejector 13 includes a nozzle 31, a needle 32, a drive device 33, and a body 34.

The nozzle 31 reduces the pressure of the refrigerant flowing into the interior from the refrigerant inlet 31a in an isentropic manner, and jects the refrigerant as a high-speed injected refrigerant (i.e., an injected fluid) from a refrigerant injection port 31f disposed at the most downstream portion in the flow direction of the refrigerant. The refrigerant injection port 31f corresponds to a fluid injection port of the present disclosure. The nozzle 31 is made of a substantially cylindrical metal (in the present embodiment, a stainless steel alloy) that gradually tapers in the flow direction of the refrigerant. The refrigerant inlet 31a is connected to a cylindrical side surface of the nozzle 31.

A refrigerant passage 31b (that is, a fluid passage) extending along a central axis CL of the nozzle 31 is provided inside the nozzle 31. The refrigerant passage 31b is provided with a tapered portion 31c, a throat portion 31d, a nozzle-side tapered portion 31e, and the like.

The tapered portion 31c has a truncated conical shape that gradually reduces the passage cross-sectional area of the refrigerant passage 31b from the refrigerant inlet 31a toward the downstream side in the flow direction of the refrigerant. The throat portion 31d is formed in the most downstream portion of the tapered portion 31c along the flow direction of the refrigerant. The throat portion 31d reduces the passage cross-sectional area of the fluid passage to be the smallest in the fluid passage at the throat portion. The nozzle-side tapered portion 31e extends from the throat portion 31d to the refrigerant injection port 31f, and gradually increases a passage cross-sectional area of the refrigerant passage 31b toward a downstream side in a flow direction of the refrigerant.

Figure 3:
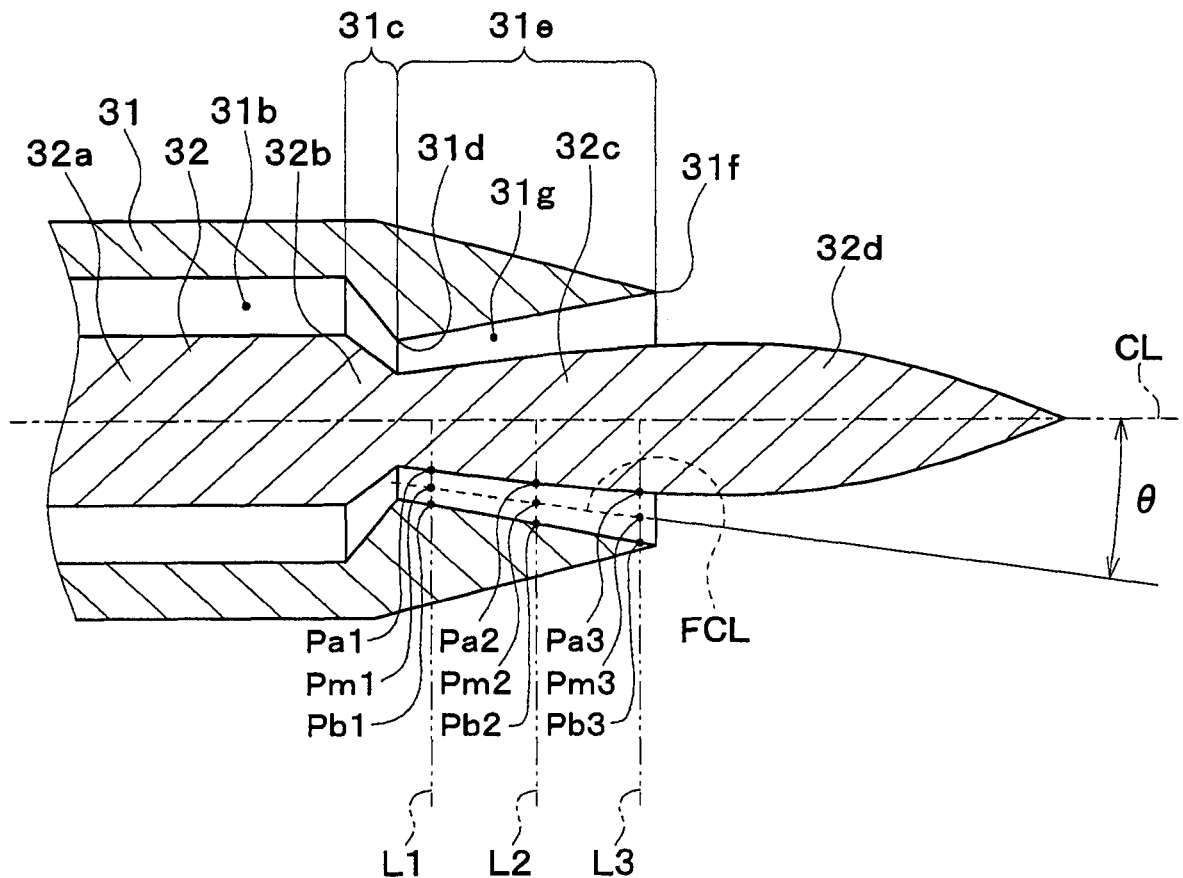
FIG. 3 is a schematic enlarged view of a part III of FIG. 2.

In the present embodiment, an outline of the nozzle-side tapered portion 31e linearly extends in an axial cross section along which the central axis CL extends as shown in FIG. 3. As such, a space defined inside the nozzle-side tapered portion 31e has a truncated cone shape in the axial cross section. That is, the tapered portion 31c and the nozzle-side tapered portion 31e define one space in which a top of the truncated cone shape of the tapered portion 31c and a top of the truncated cone shape of the nozzle-side tapered portion 31e are connected to each other. The throat portion 31d is defined in a junction connecting the tapered portion 31c and the nozzle-side tapered portion 31e.

In this example, a line drawn in an axial cross section including the central axis CL by the nozzle-side tapered portion 31e according to the present embodiment is a straight line as shown in FIG. 3. Therefore, a space defined inside the nozzle-side tapered portion 31e has a truncated cone shape. In other words, the tapered portion 31c and the nozzle-side tapered portion 31e define a space having a shape in which top portions of the truncated cone are coupled to each other, and the throat portion 31d is formed in a coupling portion between the tapered portion 31c and the nozzle-side tapered portion 31e.

The needle 32 is disposed inside the refrigerant passage 31b. The needle 32 is made of a metal (for example, a stainless steel alloy), and has a substantially columnar shape extending along the central axis CL. The central axis of the needle 32 is disposed coaxially with the central axis CL of the nozzle 31. The needle 32 changes the passage cross-sectional area of the refrigerant passage 31b by being displaced along the central axis CL.

The needle 32 has a drive shaft portion 32a, the tapered portion 32b, the needle-side tapered portion 32c, and a tip portion 32d. The drive shaft portion 32a forms an upstream portion of the needle 32 in the flow direction of the refrigerant. The drive shaft portion 32a is formed in a columnar shape. The drive device 33 is connected to an upstream end portion of the drive shaft portion 32a.

The drive device 33 is a drive unit that displaces the needle 32 along the central axis CL. In the present embodiment, an electric actuator having a stepping motor is employed as the drive device 33. The operation of the drive device 33 is controlled according to a control signal (control pulse) output from the control device.

The tapered portion 32b is formed on a downstream side of the drive shaft portion 32a along a flow direction of the refrigerant. The tapered portion 32b is formed in a truncated conical shape whose cross-sectional area decreases toward the downstream side in the flow direction of the refrigerant. According to the present embodiment, a minimum passage cross-sectional area portion of the refrigerant passage 31b is formed between the tapered portion 32b of the needle 32 and the throat portion 31d of the nozzle 31.

Further, a maximum outer diameter of the needle 32 is formed to be larger than an inner diameter of the throat portion 31d. Therefore, the drive device 33 moves the needle 32 to the downstream side along the flow direction of the refrigerant, and the tapered portion 32b is abutted against the throat portion 31d, thereby being capable of closing the refrigerant passage 31b.

The needle-side tapered portion 32c is formed on the downstream side of the tapered portion 32b in the flow direction of the refrigerant. The needle-side tapered portion 32c is formed in a truncated conical shape and has a cross-sectional area increasing toward the downstream side in the flow direction of the refrigerant. At least a part of the needle-side tapered portion 32c is positioned on an inner side of the nozzle-side tapered portion 31e during normal operation of the ejector refrigeration circuit 10.

In the axial cross section, an outer surface of the needle-side tapered portion 32c is curved as shown in FIG. 3. The refrigerant passage 31b includes a pre-injection passage 31g. The pre-injection passage 31g is defined between the outer surface of the needle-side tapered portion 32c and the inner surface of the nozzle-side tapered portion 31e, thereby having an annular cross-sectional shape. The pre-injection passage 31g has a passage cross-sectional area increasing toward the downstream side in the flow direction of the refrigerant.

More specifically, a degree of expansion of the pre-injection passage 31g increases from the upstream side toward the downstream side along the flow direction of the refrigerant. As such, an upstream portion of the pre-injection passage 31g has a passage cross-sectional area that is substantially constant, and a downstream portion of the pre-injection passage 31g has a passage cross-sectional area that gradually increases toward the downstream side along the flow direction of the refrigerant.

In the present embodiment, the pre-injection passage 31g has a shape that enables the injected refrigerant to spread outward away from the central axis CL.

Specifically, a cross section shown in FIG. 3 is referred to as an axial cross section including the central axis CL. In the axial cross section, lines perpendicular to the central axis CL are defined as virtual vertical lines L1, L2, L3. The virtual vertical lines L1, L2, L3 intersect with an outer surface of the needle 32 at needle-side intersection points Pa1, Pa2, Pa3 respectively. Points at which the virtual vertical lines L1, L2, L3 intersect with an inner surface of the nozzle-side tapered portion 31e are defined as nozzle-side intersection points Pb1, Pb2, Pb3. Each of middle points between a respective one of the needle-side intersection points Pa1, Pa2, Pa3 and a respective one of the nozzle-side intersection points Pb1, Pb2, Pb3 on a respective one of the virtual vertical lines L1, L2, L3 is defined as a midpoint Pm1, Pm2, Pm3.

In FIG. 3, L represents the virtual vertical lines, and numerals applied to L are changed from 1 to 3 in order from the upstream side in the flow direction of the refrigerant. The same applies to Pa, which is a symbol indicating the needle-side intersection point, and Pb, which is a symbol indicating the nozzle-side intersection point.

A line passing through the midpoints Pm1, Pm2, Pm3 is defined as an injection-flow center line FCL. In the axial cross section, an injection-flow spread angle θ formed on the downstream side in the flow direction of the fluid between the central axis CL and a tangent line of the injection-flow center line FCL at the refrigerant injection port 31f is 0° or greater. As a result, in the present embodiment, the pre-injection passage 31g has a shape that enables the injected refrigerant to spread outward away from the central axis CL easily.

The tip portion 32d is positioned on the downstream side of the needle-side tapered portion 32c in the flow direction of the refrigerant. The tip portion 32d is formed in a conical shape and has a cross-sectional area decreasing toward the downstream side in the flow direction of the refrigerant. In other words, the tip portion 32d is a convergent distal end whose cross-sectional area decreases toward the tip. The tip portion 32d is disposed so that at least a part of the distal end 32d protrudes from the refrigerant injection port 31f during normal operation of the ejector refrigeration circuit 10.

The body 34 is made of a substantially cylindrical metal, such as aluminum, or resin. The body 34 functions as a fixing member for supporting and fixing the nozzle 31, and forms an outer shell of the ejector 13 as shown in FIG. 2. More specifically, the nozzle 31 is fixed by press-fitting or the like so as to be accommodated inside the one end side in the longitudinal direction of the body 34.

The outer surface of the body 34 has a refrigerant suction port 34a facing an outer surface of the nozzle 31. The refrigerant suction port 34a passes through the body 34 and is in fluid communication with the refrigerant injection port 31f of the nozzle 31. The refrigerant suction port 34a corresponds to a fluid suction port of the present disclosure. The refrigerant suction port 34a is a through hole. The refrigerant suction port 34a takes in the refrigerant from an evaporator 16 (described later) to the ejector 13 by using the suction force generated by the injected refrigerant discharged from the refrigerant injection port 31f of the nozzle 31 as a suction refrigerant (suction fluid).

Further, a mixing portion 34b, a suction passage 34c, and a diffuser portion 34d are formed inside the body 34. The mixing portion 34b is a space in which the injected refrigerant discharged from the refrigerant injection port 31f and the suction refrigerant drawn from the refrigerant suction port 34a are mixed.

The suction passage 34c is a refrigerant passage that guides the suction refrigerant from the refrigerant suction port 34a to the mixing portion 34b. The nozzle 31 has a tapered shape. The suction passage 34c is a space defined between an outer surface of a tip portion of the nozzle 31 and the inner surface of the body 34. As such, a refrigerant outlet of the suction passage 34c has an annular shape defined on an outer side of the refrigerant injection port 31f.

Further, the passage cross-sectional area of the suction passage 34c gradually decreases along the flow direction of the refrigerant. As a result, a flow speed of the suction refrigerant flowing through the suction passage 34c can be gradually increased.

The diffuser portion 34d is a space which is disposed so as to be continuous with the outlet of the mixing portion 34b and is formed such that the passage cross-sectional area thereof increases toward the downstream side along the flow direction of the refrigerant. As a result, the diffuser portion 34d converts a velocity energy of the mixture refrigerant into a pressure energy. In other words, the diffuser portion 34d is a pressure increasing portion that slows down the flow speed of the mixture refrigerant to increase the pressure of the mixed refrigerant.

As shown in FIG. 1, an inlet side of the accumulator 14 is connected to a refrigerant outlet of the diffuser portion 34d. The accumulator 14 is a gas-liquid separation unit that separates the gas and liquid of the refrigerant that has flowed out of the diffuser portion 34d from each other. The accumulator 14 according to the present embodiment also functions as a reservoir for storing a part of the separated liquid-phase refrigerant as an excess refrigerant in the cycle.

The gas-phase refrigerant outflow port of the accumulator 14 is connected to the intake port side of the compressor 11. On the other hand, the liquid-phase refrigerant outflow port of the accumulator 14 is connected to the refrigerant inlet side of the evaporator 16 through a fixed throttle 15 as a pressure reducing portion. As the fixed throttle 15, an orifice, a capillary tube, or the like can be employed.

The evaporator 16 is a heat-absorbing heat exchanger that evaporates a low-pressure refrigerant and exerts a heat absorbing action by exchanging a heat between the low-pressure refrigerant reduced in pressure by the fixed throttle 15 and the air blown from the blower fan 16a toward the vehicle compartment. The blower fan 16a is an electric blower whose rotation speed (the amount of air to be blown) is controlled according to a control voltage output from the control device. The refrigerant outlet of the evaporator 16 is connected to the side of the refrigerant suction port 34a of the ejector 13.

Next, a control device (not shown) is configured by a well-known microcomputer including a CPU, a ROM, a RAM, and the like, and peripheral circuits of the microcomputer. The control device performs various calculations and processes based on a control program stored in the ROM. The operation of the various electric actuators described above is controlled to control the operation of the compressor 11, the cooling fan 12d, and the blower fan 16a.

In addition, the control device is connected with multiple air conditioning control sensor groups such as an inside air temperature sensor, an outside air temperature sensor, an insolation sensor, an evaporator temperature sensor, and a discharge pressure sensor, and the control device receives detection values from those sensor groups.

More specifically, the inside air temperature sensor is an inside air temperature detection unit that detects the vehicle interior temperature. The outside air temperature sensor is an outside air temperature detection unit that detects the outside air temperature. The insolation sensor is an insolation amount detection unit that detects the amount of insolation in the vehicle compartment. The evaporator temperature sensor is an evaporator temperature detection unit that detects the blowing air temperature (evaporator temperature) of the evaporator 16. The discharge pressure sensor is an outlet side pressure detection unit that detects the pressure of the outlet side refrigerant of the radiator 12.

Furthermore, an operation panel not shown is connected to an input side of the control device. The operation panel is disposed in the vicinity of an instrument panel positioned at a front part in the vehicle compartment. Operation signals output from various operation switches disposed on the operation panel are input to the control device. As the various operation switches provided on the operation panel, an air conditioning operation switch for requesting to perform air conditioning of the vehicle compartment, a vehicle interior temperature setting switch for setting the temperature of the vehicle interior, and the like are provided.

In the control device according to the present embodiment, a control unit for controlling the operation of various control target devices connected to the output side of the control device is integrally formed. Among the control devices, a configuration (hardware and software) for controlling the operation of each control target device configures a control unit of each control target device.

For example, according to the present embodiment, the discharge capacity control unit is configured to control the refrigerant discharge capacity of the compressor 11 by controlling the operation of the discharge capacity control valve of the compressor 11. The ejector control unit is configured to control the operation of the drive device 33. The discharge capacity control unit and the ejector control unit may be configured by another control device separate from the above control device.

Next, the operation of the ejector refrigeration circuit 10 according to the present embodiment in the above-described configuration will be described. First, when the operation switch of the operation panel is turned on, the control device operates the discharge capacity control valve of the compressor 11, the cooling fan 12d, the blower fan 16a, and the like. As a result, the compressor 11 suctions the refrigerant, compresses the refrigerant, and discharges the refrigerant.

The high-temperature high-pressure refrigerant discharged from the compressor 11 flows into the condensing portion 12a of the radiator 12, exchanges a heat with the outside air blown from the cooling fan 12d, radiates the heat, and condenses. The refrigerant condensed by the condensing portion 12a is separated into gas and liquid by the receiver portion 12b. The liquid-phase refrigerant separated by the receiver portion 12b exchanges the heat with the outside air blown from the cooling fan 12d by the subcooling unit 12c, and further radiates the heat to become a subcooled liquid-phase refrigerant.

The subcooling state high-pressure liquid-phase refrigerant flowing out from the subcooling unit 12c of the radiator 12 is reduced in pressure in an isentropic manner in the refrigerant passage 31b provided between the inner surface of the nozzle 31 of the ejector 13 and the outer surface of the needle 32, and is ejected from the refrigerant injection port 31f. At that time, the control device controls the operation of the drive device 33 so that the degree of superheat of the refrigerant on the outlet side of the evaporator 16 approaches a predetermined reference degree of superheat KSH.

The refrigerant that has flowed out of the evaporator 16 is drawn from the refrigerant suction port 34*a* by the suction action of the injected refrigerant ejected from the refrigerant injection port 31*f* of the nozzle 31. The suction refrigerant drawn from the refrigerant suction port 34*a* flows into the mixing portion 34*b* through the suction passage 34*c* and is mixed with the injected refrigerant. The speed of the suction refrigerant is increased when the suction refrigerant passes through the suction passage 34*c*. As a result, a speed difference between the speed of the suction refrigerant and the speed of the injected refrigerant is reduced to reduce a mixing loss.

The refrigerant mixed in the mixing portion 34*b* flows into the diffuser portion 34*d*. In the diffuser portion 34*d*, a kinetic energy of the mixture refrigerant is converted into a pressure energy by enlarging the passage cross-sectional area. As a result, the pressure of the mixture refrigerant rises. The refrigerant that has flowed out of the diffuser portion 34*d* flows into the accumulator 14 and is separated into gas and liquid.

The liquid-phase refrigerant separated by the accumulator 14 is reduced in pressure by the fixed throttle 15 and flows into the evaporator 16. The refrigerant flowing into the evaporator 16 absorbs the heat from the air blown by the blower fan 16*a* and evaporates. As a result, the air is cooled. The refrigerant that has flowed out of the evaporator 16 is drawn from the refrigerant suction port 34*a* of the ejector 13 as described above. On the other hand, the gas-phase refrigerant separated by the accumulator 14 is drawn into the compressor 11 and compressed again.

The ejector refrigeration circuit 10 according to the present embodiment can operate as described above to cool the air blown into the vehicle compartment.

At this time, in the ejector refrigeration circuit 10 according to the present embodiment, the refrigerant increased in pressure by the diffuser portion 34*d* of the ejector 13 is drawn into the compressor 11. Therefore, according to the ejector refrigeration circuit 10, the power consumption of the compressor 11 can be reduced and the coefficient of performance (COP) of the cycle can be improved, as compared with a normal refrigeration cycle device in which the pressure of the refrigerant evaporated in the evaporator and the pressure of the refrigerant drawn into the compressor are substantially equal.

Further, since the ejector 13 according to the present embodiment includes the needle 32 and the drive device 33, the passage cross-sectional area of the minimum passage cross-sectional area portion can be adjusted in accordance with the load variation of the ejector refrigeration circuit 10. Therefore, the ejector 13 can be appropriately operated in accordance with the load variation of the ejector refrigeration circuit 10.

Further, in the ejector 13 according to the present embodiment, the tip portion 32*d* of the needle 32 protrudes from the refrigerant injection port 31*f* of the nozzle 31 toward the downstream side along the flow direction of the refrigerant. As such, the nozzle 31 expands the injected refrigerant freely as a plug nozzle by injecting the fluid along the needle 32. As a result, a flow speed of the injected refrigerant can be increased to a supersonic speed.

Further, the injection-flow spread angle θ formed by the central axis C and the tangent line of the injection-flow center line FCL at the refrigerant injection port 31*f* on the downstream side in the flow direction of the fluid is 0° or greater. As such, the flow direction of the injected refrigerant can be changed outward away from the central axis CL.

Therefore, the injected refrigerant and the suction refrigerant can be efficiently mixed with each other, even though the suction passage 34*c* has the refrigerant outlet opening annularly on the outer side of the refrigerant injection port 31*f* and the suction refrigerant gets mixed with the injected refrigerant from the radially outer side of the refrigerant injection port 31*f*.

In other words, the ejector 13 in the present embodiment increases the flow speed of the injected refrigerant with high efficiency as an ejector having a plug nozzle and mixes the injected refrigerant and the suction refrigerant with high efficiency. As such, the ejector 13 draws the refrigerant with high efficiency and increases a pressure of the refrigerant with high efficiency. Thus, the coefficient of performance (COP) of the ejector refrigeration circuit 10 can be further improved.

In the ejector 13 according to the present embodiment, the drive device 33 moves the needle 32 along the central axis CL, thereby closing the refrigerant passage 31*b* in the nozzle 31. In the ejector 13 described above, when the needle 32 reduces the passage cross-sectional area in the throat portion 31*d* to be very small as just before the needle 32 closes the refrigerant passage 31*b*, a volume of the injected refrigerant ejected from the nozzle 31 may be small.

When the volume of the injected refrigerant discharged from the nozzle 31 is small, the flow speed of the injected refrigerant decreases. As such, inertia force of the injected refrigerant along the central axis CL decreases. Therefore, the injected refrigerant is attracted to the tip portion 32*d* of the needle easily.

In the present embodiment, the ejector 13 is configured to close the refrigerant passage 31*b* defined in the nozzle 31. However, the ejector 13 can increase the flow speed of the injected fluid sufficiently as an ejector having a plug nozzle and can mix the injected fluid and the suction fluid with high efficiency by changing the flow direction of the injected refrigerant outward away from the central axis CL.

In the ejector 13 according to the present embodiment, the needle-side tapered portion 32*c* is formed in a shape and has a cross-sectional area increasing toward the downstream side along the flow direction of the refrigerant. Therefore, the injection-flow spread angle θ can be reliably and easily set to 0° or greater.

Further, in the ejector 13 according to the present embodiment, the shape of the pre-injection passage 31*g* is formed such that the passage cross-sectional area is slightly increased toward the downstream side along the flow direction of the refrigerant. With the shape described above, the pre-injection passage 31*g* can be used as a homogenizing space for homogeneously mixing boiling nucleus generated in the throat portion 31*d* with the liquid-phase refrigerant.

Then, the refrigerant in a gas-liquid two phase in which the gas phase and the liquid phase are uniformly mixed is ejected from the refrigerant injection port 31*f*, thereby being capable of efficiently accelerating the injected refrigerant. As a result, the ejector 13 can exhibit the higher ejector efficiency, and can exhibit the high suction capability and the pressure increase capability.

Figure 4:
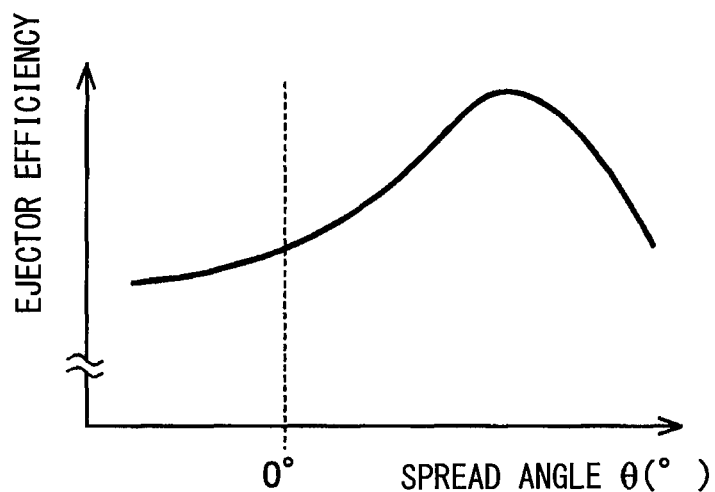
FIG. 4 is a graph showing a relationship between an injection-flow spread angle and an ejector efficiency.

According to studies and studies by the inventors of the present disclosure, as shown in FIG. 4, the ejector can be efficiency brought close to the maximum value with the use of the pre-injection passage 31*g* as a homogenization space and setting the injection-flow spread angle θ to 0° or more.

In FIG. 4, θ=0° means that the central axis CL and the tangent line of the injection-flow center line FCL at the refrigerant injection port 31f are parallel to each other. In a range of θ<0°, the central axis CL and the tangent line of the injection-flow center line FCL at the refrigerant injection port 31f are gradually brought closer to each other toward the downstream side along the flow direction of the refrigerant, and intersect with each other on the downstream side of the refrigerant injection port 31f in the flow direction of the refrigerant.

In the ejector 13 according to the present embodiment, an outline of the nozzle-side tapered portion 31e in the axial cross section along which the central axis CL extends is a straight line. According to the above configuration, the nozzle-side tapered portion 31e can be easily processed and formed.

In the ejector 13 according to the present embodiment, the outer surface of the needle-side tapered portion 32c in the axial cross section along which the central axis CL extends is curved. According to the above configuration, the shape of the needle-side tapered portion 32c that is more easily processed than the nozzle-side tapered portion 31e is adjusted, to thereby easily appropriately change the passage cross-sectional area of the pre-injection passage 31g.

Second Embodiment

Figure 5:
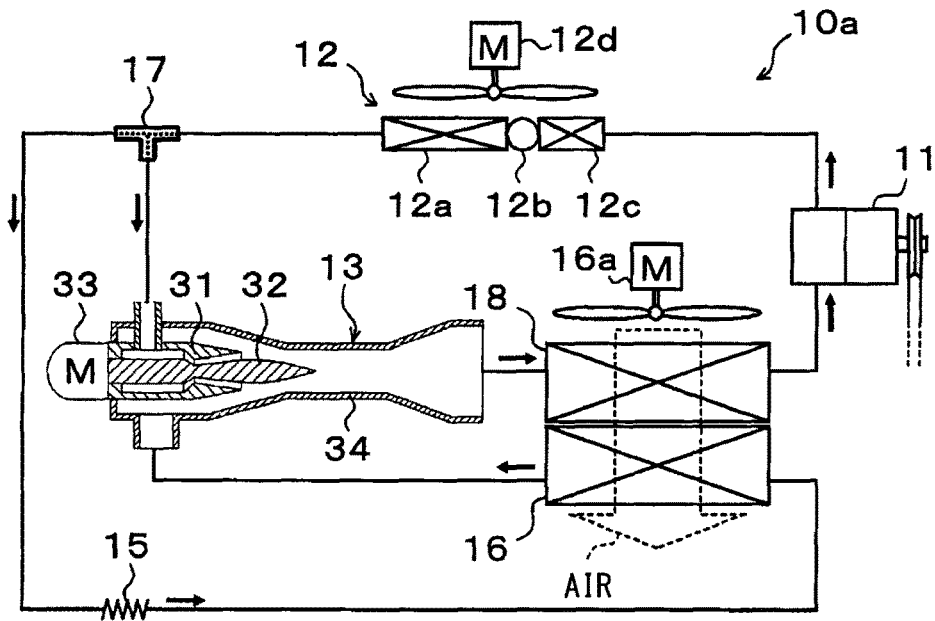
FIG. 5 is an overall configuration diagram of an ejector refrigeration circuit according to a second embodiment.

In the present embodiment, as shown in the overall configuration diagram of FIG. 5, an ejector 13 is applied to an ejector refrigeration circuit 10a. In FIG. 5, the same or equivalent parts as those of the first embodiment are denoted by the same reference numerals. This also applies to the following drawings.

The ejector refrigeration circuit 10a has a branch portion 17 that branches a flow of refrigerant that has flowed out of a radiator 12. As the branch portion 17, a three-way joint or the like having three inflow and outflow ports can be employed. One of the three inflow and outflow ports of the three-way joint may be used as the refrigerant inflow port, and the other two may be used as the refrigerant outflow ports.

The refrigerant inlet 31a side of the ejector 13 is connected to one refrigerant outflow port of the branch portion 17. The other refrigerant outflow port of the branch portion 17 is connected to a refrigerant inlet side of an evaporator 16 through a fixed throttle 15. In the following description, the evaporator 16 is described as a suction side evaporator 16 for clarity of description.

In the ejector refrigeration circuit 10a, a refrigerant inlet side of an outflow side evaporator 18 is connected to a refrigerant outlet of a diffuser portion 34d of the ejector 13. The outflow side evaporator 18 is a heat-absorbing heat exchanger that evaporates a low-pressure refrigerant and exerts a heat absorbing action by exchanging a heat between the low-pressure refrigerant reduced in pressure by the ejector 13 and an air blown from the blower fan 16a toward the vehicle compartment.

The outflow side evaporator 18 is integrally formed with the suction side evaporator 16. Specifically, each of the suction side evaporator 16 and the outflow side evaporator 18 is configured by a so-called tank-and-tube type heat exchanger having multiple tubes for circulating the refrigerant, and a pair of collection and distribution tanks disposed on both ends of the multiple tubes for collecting or distributing the refrigerant flowing through the tubes.

The collection and distribution tanks of the suction side evaporator 16 and the outflow side evaporator 18 are made of the same material, thereby integrating the suction side evaporator 16 and the outflow side evaporator 18 together.

At this time, according to the present embodiment, the suction side evaporator 16 and the outflow side evaporator 18 are disposed in series with respect to the air flow direction so that the outflow side evaporator 18 is disposed on the upstream side of the suction side evaporator 16 in the air flow direction. Thus, the air flows as indicated by a dashed arrow in FIG. 5.

In the ejector refrigeration circuit 10a, the accumulator 14 is eliminated, and the outlet side of the outflow side evaporator 18 is connected to the intake port side of the compressor 11. The other configurations of the ejector refrigeration circuit 10a and the ejector 13 are the same as those of the first embodiment.

Next, the operation of the ejector refrigeration circuit 10a according to the present embodiment in the above-described configuration will be described. When the control device operates the compressor 11 or the like, a high-temperature high-pressure refrigerant discharged from the compressor 11 is radiated by the radiator 12 to become subcooled liquid-phase refrigerant, similarly to the first embodiment. The flow of the refrigerant from the radiator 12 is branched in the branch portion 17, and is divided into a refrigerant flow flowing to the ejector 13 and a refrigerant flow flowing to the fixed throttle 15.

At this time, a ratio between a flow rate of the refrigerant flowing from the branch portion 17 into the ejector 13 and a flow rate of the refrigerant flowing from the branch portion 17 into the fixed throttle 15 is determined according to a minimum passage cross-sectional area of the refrigerant passage 31b of the nozzle 31. Therefore, the control device according to the present embodiment controls the operation of the drive device 33 so that both of the outflow side evaporator 18 and the suction side evaporator 16 exhibits an appropriate refrigeration capacity and can exhibit a high coefficient of performance (COP) in the entire cycle.

The refrigerant flowing from the branch portion 17 to the ejector 13 side is reduced in pressure in an isentropic manner in the refrigerant passage 31b provided between an inner surface of the nozzle 31 of the ejector 13 and an outer surface of the needle 32, and is ejected from the refrigerant injection port 31f. The refrigerant that has flowed out from the suction side evaporator 16 is drawn from the refrigerant suction port 34a of the ejector 13 by the suction action of the injected refrigerant.

The injected refrigerant ejected from the refrigerant injection port 31f and the suction refrigerant drawn from the refrigerant suction port 34a are mixed together in the mixing portion 34b and increased in pressure in the diffuser portion 34d in the same manner as in the first embodiment.

The refrigerant that has flowed out of the diffuser portion 34d flows into the outflow side evaporator 18. In the outflow side evaporator 18, the refrigerant that has flowed out from the diffuser portion 34d absorbs the heat from the air blown by the blower fan 16a and evaporates. As a result, the air is cooled. The gas-phase refrigerant flowing out of the outflow side evaporator 18 is drawn into the compressor 11 and compressed again.

On the other hand, the refrigerant that has flowed out from the branch portion 17 to the fixed throttle 15 side is reduced in pressure and expanded in an isenthalpic manner by the fixed throttle 15, and flows into the suction side evaporator 16. The refrigerant flowing into the suction side evaporator 16 absorbs the heat from the air after passing through the outflow side evaporator 18 and evaporates. As a result, the air is further cooled and blown into the vehicle compartment. The refrigerant that has flowed out of the suction side evaporator 16 is drawn into the ejector 13 through the refrigerant suction port 34a.

The ejector refrigeration circuit 10a according to the present embodiment operates as described above, and can cool the air blown into the vehicle compartment. At this time, similarly to the first embodiment, since a refrigerant evaporation temperature of the outflow side evaporator 18 increases more than a refrigerant evaporation temperature of the suction side evaporator 16 by the pressure increasing action of the diffuser portion 34d, a temperature difference between the refrigerant evaporation temperatures of the outflow side evaporator 18 and the suction side evaporator 16 and the air can be ensured to efficiently cool the air.

Further, in the ejector refrigeration circuit 10a, since the refrigerant outlet of the outflow side evaporator 18 is connected to the intake side of the compressor 11, the refrigerant increased in pressure by the diffuser portion 34d of the ejector 13 can be drawn into the compressor 11. As a result, similarly to the first embodiment, the power consumption of the compressor 11 can be reduced and the coefficient of performance (COP) of the cycle can be improved.

Further, in the ejector refrigeration circuit 10a according to the present embodiment, since the same ejector 13 as that of the first embodiment is employed, the same effects as those of the first embodiment can be obtained. In other words, even when the ejector 13 is applied to the ejector refrigeration circuit 10a, both of the acceleration of the injected refrigerant and the improvement of the mixing property of the injected refrigerant and the suction refrigerant can be performed similarly to the plug nozzle, and a high suction capability and a high pressure increase capability can be exhibited.

Third Embodiment

Figure 6:
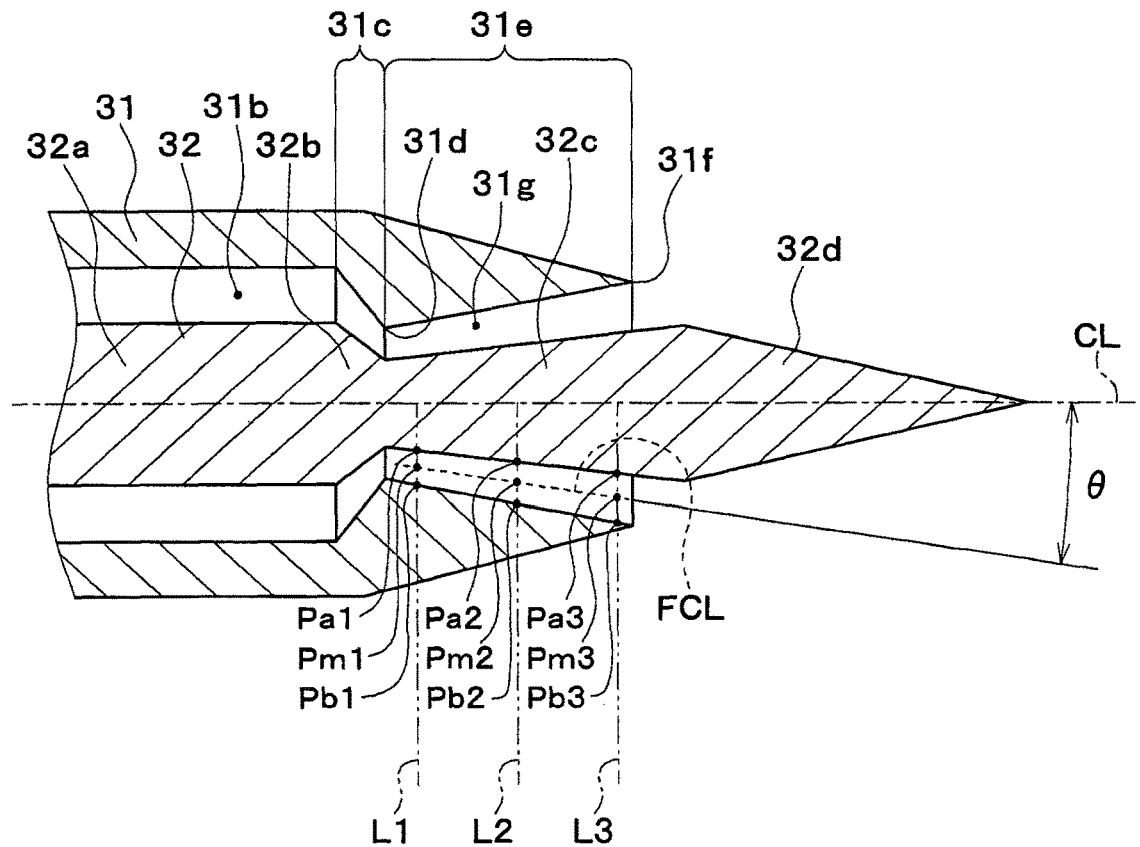
FIG. 6 is a schematic enlarged view of an ejector according to a third embodiment.

In an ejector 13 according to the present embodiment, the shape of the needle 32 is changed from that of the first embodiment as shown in FIG. 6. FIG. 6 is a drawing corresponding to FIG. 3 described in the first embodiment. This also applies to FIGS. 7 to 9 described later.

More specifically, in the needle 32 according to the present embodiment, an outline of a needle-side tapered portion 32c in an axial cross section along which a central axis CL extends is a straight line. Therefore, the needle-side tapered portion 32c according to the present embodiment is formed in a truncated cone shape. Further, similarly to the first embodiment, the injection-flow spread angle θ is formed to be 0° or more.

Other configurations and operations of the ejector 13 and the ejector refrigeration circuit 10 are the same as those of the first embodiment. Therefore, the same effects as those of the first embodiment can be obtained also in the ejector 13 of the present embodiment. Further, since a line drawn in the axial cross section including the central axis CL by the needle-side tapered portion 32c is straight, the needle-side tapered portion 32c can be easily machined and formed.

Fourth Embodiment

Figure 7:
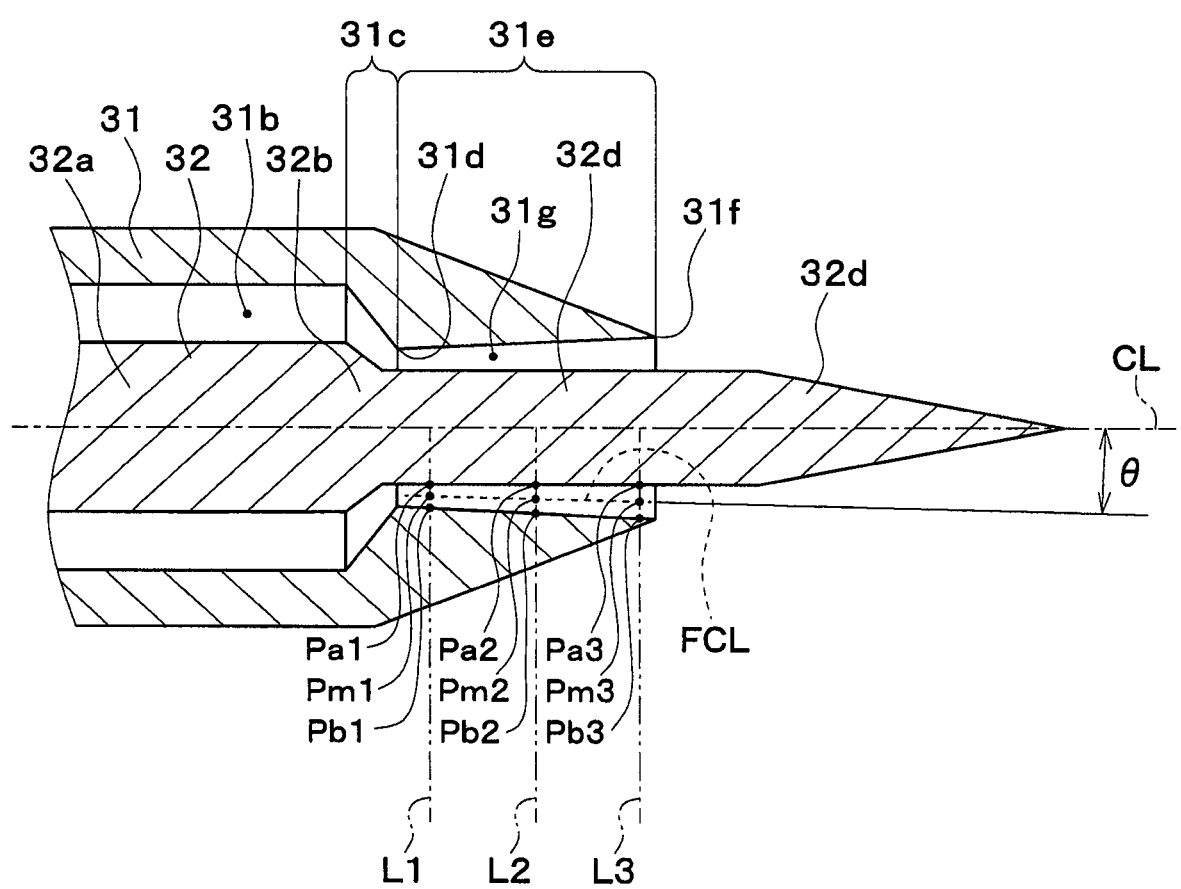
FIG. 7 is a schematic enlarged view of an ejector according to a fourth embodiment.

In an ejector 13 according to the present embodiment, a shape of a needle 32 is changed from that of the first embodiment as shown in FIG. 7. Specifically, in the needle 32 of the present embodiment, a portion corresponding to the needle-side tapered portion 32c described in the first embodiment is formed in a columnar shape. Further, similarly to the first embodiment, the injection-flow spread angle θ is formed to be 0° or more.

Other configurations and operations of the ejector 13 and the ejector refrigeration circuit 10 are the same as those of the first embodiment. Therefore, the same effects as those of the first embodiment can be obtained also in the ejector 13 of the present embodiment. Further, since the needle-side tapered portion 32c is formed in a columnar shape, the needle-side tapered portion 32c can be easily processed and formed.

Fifth Embodiment

Figure 8:
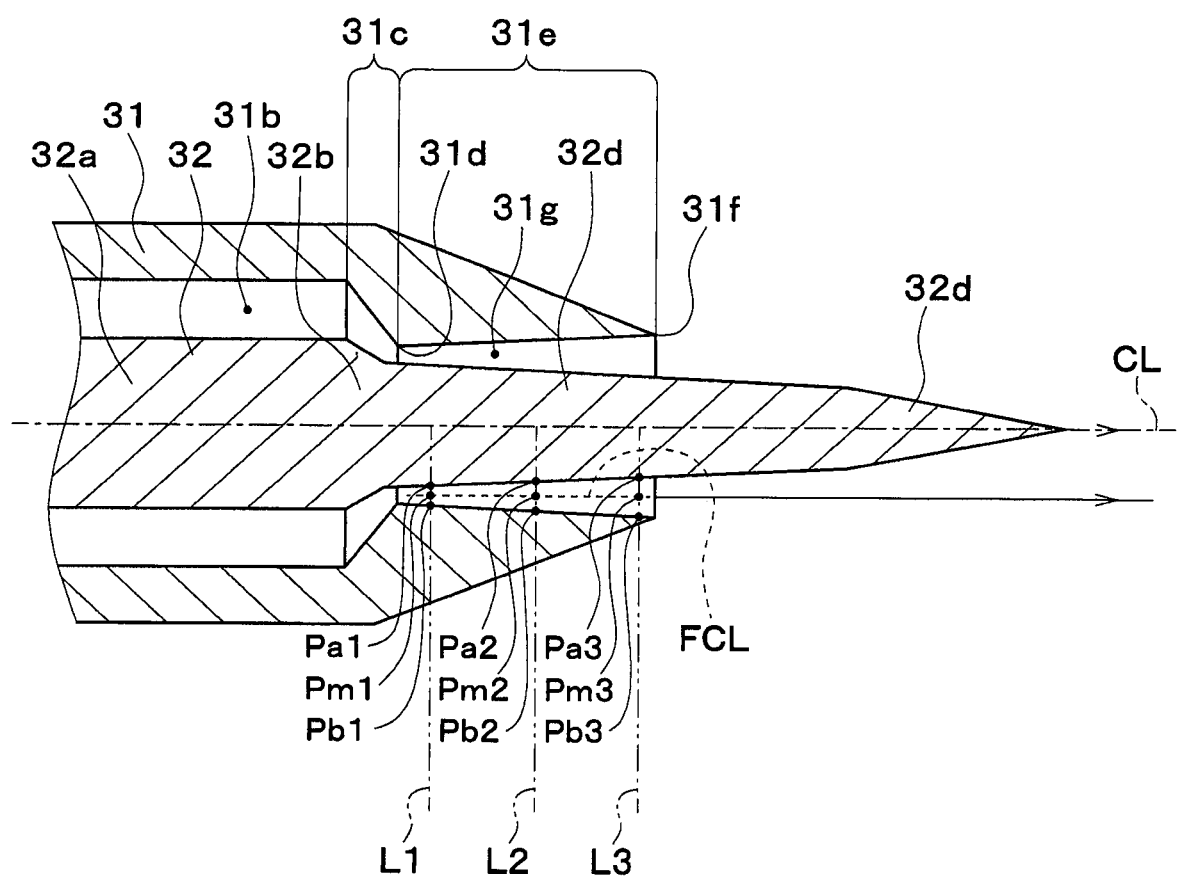
FIG. 8 is a schematic enlarged view of an ejector according to a fifth embodiment.

In an ejector 13 according to the present embodiment, a shape of a needle 32 is changed from that of the first embodiment as shown in FIG. 8. Specifically, the needle 32 in the present embodiment includes a needle-side tapered portion 32c. The needle-side tapered portion 32c is formed in a truncated conical shape and has a cross-sectional area decreasing toward the downstream side in the flow direction of the refrigerant. The injection-flow spread angle θ is set to 0°. In other words, a central axis CL and a tangent line of the injection-flow center line FCL at a refrigerant injection port 31f are disposed in parallel to each other.

Other configurations and operations of the ejector 13 and the ejector refrigeration circuit 10 are the same as those of the first embodiment. Therefore, also in the ejector 13 according to the present embodiment, the mixing property between the injected refrigerant and the suction refrigerant can be improved, and a high suction capability and a high pressure increase capability can be exhibited, as compared with the ejector of the prior art in which the injection-flow spread angle θ<0°.

Sixth Embodiment

In the needles 32 according to the first to fifth embodiments, the maximum outer diameter of the needle-side tapered portion 32c or the tip portion 32d positioned on the downstream side of the tapered portion 32b in the flow direction of the refrigerant is formed to be smaller than the inner diameter of the throat portion 31d of the nozzle 31.

For that reason, in the ejector 13 according to the first to fifth embodiments, when the refrigerant passage 31b is closed, the tapered portion 32b is brought into contact with the throat portion 31d from the upstream side in the flow direction of the refrigerant. Further, when the needle 32 of the embodiments described above is disposed in the refrigerant passage 31b of the nozzle 31, the needle 32 is inserted and disposed in the refrigerant passage 31b of the nozzle 31 from the upstream side in the flow direction of the refrigerant.

Figure 9:
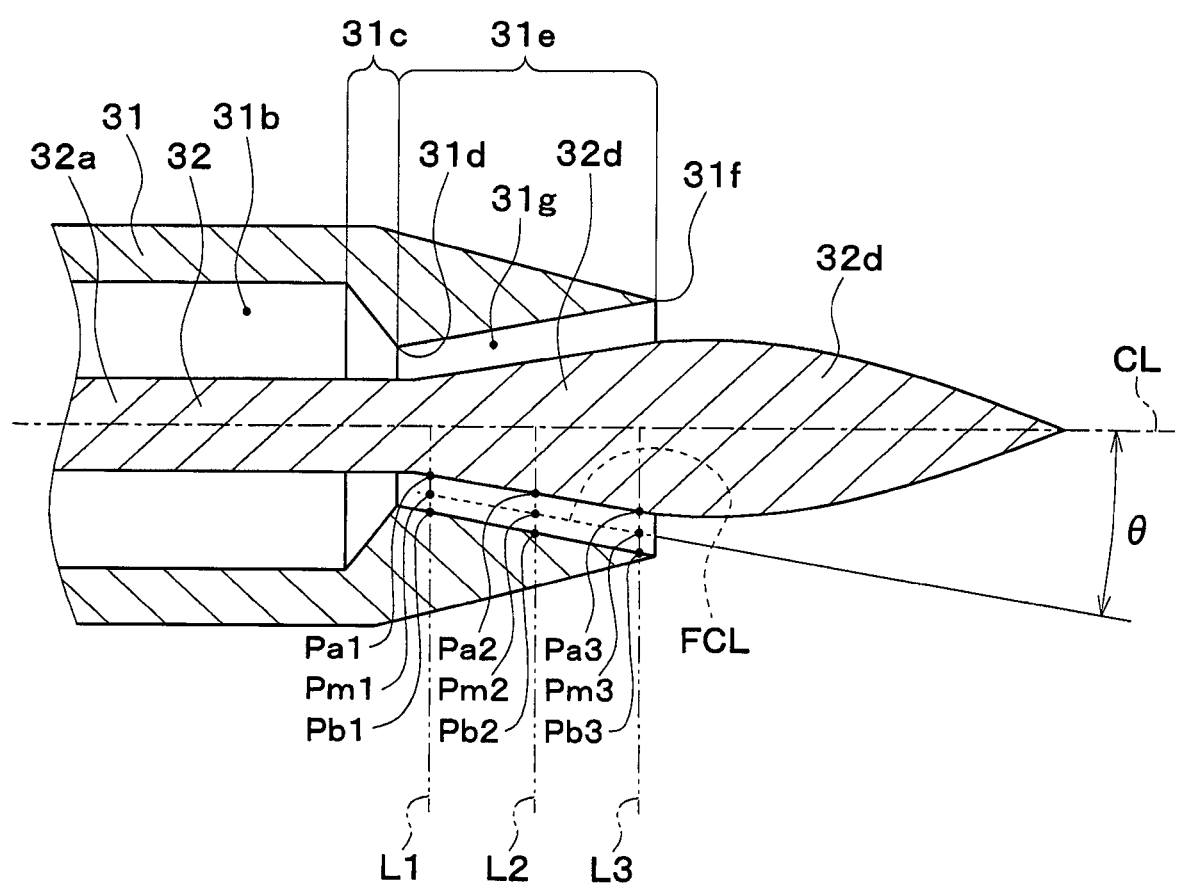
FIG. 9 is a schematic enlarged view of an ejector according to a sixth embodiment.

On the other hand, in a needle 32 according to the present embodiment, as shown in FIG. 9, a maximum outer diameter of a needle-side tapered portion 32c or a tip portion 32d is formed to be larger than an inner diameter of a throat portion 31d of a nozzle 31.

For that reason, in the ejector 13 according to the present embodiment, when a refrigerant passage 31b is closed, the needle-side tapered portion 32c comes in contact with the throat portion 31d from the downstream side in the flow direction of the refrigerant. Further, in the ejector 13 according to the present embodiment, the tapered portion 32b is eliminated, and when the needle 32 is disposed in the refrigerant passage 31b of the nozzle 31, the needle 32 is inserted and disposed in the refrigerant passage 31b of the nozzle 31 from the downstream side in the flow direction of the refrigerant.

Other configurations and operations of the ejector 13 and the ejector refrigeration circuit 10 are the same as those of the first embodiment. Therefore, the same effects as those of the first embodiment can be obtained also in the ejector 13 of the present embodiment.

Further, in the ejector 13 according to the present embodiment, since the maximum outer diameters of the needle-side tapered portion 32c and the tip portion 32d are formed to be larger than the inner diameter of the throat portion 31d of the nozzle 31, the injection-flow spread angle θ is easily enlarged. Therefore, the present invention is effective when applied to an ejector in which the injection-flow spread angle θ at which the ejector efficiency becomes the maximum value becomes a relatively large value.

Other Embodiments

The present disclosure is not limited to the embodiments described above, and various modifications can be made as follows within a range not departing from the spirit of the present disclosure. The technical features disclosed in each of the above embodiments may be appropriately combined together within a practicable range. For example, the ejector 13 described in the third to sixth embodiments may be applied to the ejector refrigeration circuit 10a described in the second embodiment.

(1) The configuration of the ejector 13 is not limited to that disclosed in the embodiments described above.

For example, in the embodiments described above, an example has been described in which the line drawn in the axial cross section including the central axis CL by the nozzle-side tapered portion 31e is a straight line, but the line drawn in the axial cross section by the nozzle-side tapered portion 31e is not limited to the straight line.

In other words, if a refrigerant passage functioning as a homogenization space can be provided between the needle-side tapered portion 32c and the nozzle-side tapered portion 31e, and the injection-flow spread angle θ can be 0° or more, the line drawn in the axial cross section by the nozzle-side tapered portion 31e may be curved. Further, the shape may be a combination of multiple lines. Similarly, the line drawn by the needle-side tapered portion 32c in the axial cross section may have a shape in which multiple lines are combined together.

In the embodiments described above, the refrigerant passage defined between the needle-side tapered portion 32c and the nozzle-side tapered portion 31e has a shape so that a passage cross-sectional area of the refrigerant passage increases toward the downstream side in the flow direction of the refrigerant, but the shape of the refrigerant passage is not limited to the above example. For example, the refrigerant passage may have a shape so that the passage cross-sectional area of the refrigerant passage is fixed toward the downstream side in the flow direction of the refrigerant as long as the refrigerant passage serves as a homogenizing space.

In each of the embodiments described above, an example in which the drive device 33 configured by an electric actuator is employed has been described, but the drive device 33 is not limited to the above example. For example, a structure including a temperature sensing unit having a pressure responsive member which is displaced in accordance with the temperature and pressure of the refrigerant on the outlet side of the evaporator 16 may be provided, and configured by a mechanical mechanism for transmitting the displacement of the pressure responsive member to the throttle valve body.

Furthermore, in order to obtain the effects of the ejector according to the present disclosure, that is, the effects of accelerating the injected refrigerant and improving the mixing property of the injected refrigerant and the suction refrigerant in the same manner as the plug nozzle, the drive device 33 is not necessarily configured.

(2) The components configuring the ejector refrigeration circuits 10 and 10a are not limited to those disclosed in the embodiments described above.

For example, in the embodiments described above, an example has been described in which the engine driven variable capacity type compressor is employed as the compressor 11, but the fixed capacity type compressor may be employed as the compressor 11, which adjusts the refrigerant discharge capacity by changing the operation rate of the compressor by the engagement and disengagement of the electromagnetic clutch. Further, an electric compressor including a fixed capacity type compression mechanism and an electric motor, which operates by being supplied with an electric power, may be employed. In the electric compressor, the refrigerant discharge capacity can be controlled by adjusting the rotation speed of the electric motor.

In the embodiments described above, an example in which a subcooled type heat exchanger is employed as the radiator 12 has been described, but the configuration of the radiator 12 is not limited to the above example. For example, a normal radiator including only the condensing portion 12a may be employed. Further, a receiver-integrated condenser may be employed in which a liquid receiver (receiver) for separating the gas and liquid of the refrigerant radiated by the radiator and storing the excess liquid-phase refrigerant is integrated together with an ordinary radiator.

Further, for example, when a normal radiator is operated, the refrigerant flowing into the nozzle 31 of the ejector 13 may be a gas-liquid two-phase refrigerant. In the ejector according to the present disclosure, the refrigerant in a gas-liquid mixed phase state is freely expanded to accelerate to a two-phase sound speed or higher. Therefore, the refrigerant flowing into the nozzle 31 is not limited to the subcooled liquid-phase refrigerant, and may be a saturated liquid phase refrigerant, a gas-liquid two-phase refrigerant, or a refrigerant in a supercritical state.

Further, an expansion valve for reducing the pressure of the high-pressure refrigerant to the intermediate-pressure refrigerant may be added to the downstream side of the radiator 12.

In addition, in the embodiments described above, although R134a is employed as the refrigerant, the refrigerant is not limited to the above example. For example, R1234yf, R600a, R410A, R404A, R32, R407C, or the like may be employed.

Alternatively, a mixture refrigerant or the like in which multiple types of those refrigerants are mixed together may be employed. Further, carbon dioxide may be employed as the refrigerant to configure a supercritical refrigeration cycle in which the high-pressure side refrigerant pressure is equal to or higher than the critical pressure of the refrigerant.

(3) The applicable ejector refrigeration circuit of the ejector 13 according to the present disclosure is not limited to that disclosed in the embodiments described above.

For example, different cooling target spaces may be cooled by the suction side evaporator 16 and the outflow side evaporator 18 in a cycle configuration similar to that of the ejector refrigeration circuit 10a described in the second embodiment. According to the above configuration, different cooling target spaces can be cooled in different temperature zones. For example, the air circulated and blown to the in-vehicle refrigerator may be cooled by the suction side evaporator 16, and the air blown into the vehicle compartment may be cooled by the outflow side evaporator 18.

In addition, the present invention may be applied to an ejector refrigeration circuit including a branch portion that eliminates the accumulator 14 and branches the flow of refrigerant that has flowed out of the diffuser portion 34d of the ejector 13, an outflow side evaporator that evaporates one refrigerant branched at the branch portion and flows out to the intake side of the compressor, and a suction side evaporator that evaporates the other refrigerant branched at the branch portion and flows out to the refrigerant suction port side with respect to the ejector refrigeration circuit 10 described in the first embodiment.

(4) In each of the embodiments described above, an example in which the ejector 13 according to the present disclosure is applied to the ejector refrigeration circuits 10 and 10a used in a vehicle air conditioner has been described, but the application of the ejector 13 according to the present disclosure is not limited to the above example. For example, the present disclosure may be applied to an ejector refrigeration circuit used in a stationary air conditioner, a cold storage warehouse, and a cooling device for a vending machine, or may be applied to other than an ejector refrigeration circuit.

The invention claimed is:

1. An ejector comprising: a nozzle that reduces a pressure of a fluid in a liquid phase or a fluid in a gas-liquid two-phase and discharges, as an injected fluid, the fluid in the liquid phase or the fluid in the gas-liquid two phase at a high speed from a fluid injection port; a needle that is disposed in a fluid passage defined in the nozzle and extends along a central axis of the nozzle; and a body including a fluid suction port that draws, as a suction fluid, a fluid from an outside of the body by using a suction force generated by the injected fluid, and a pressure increasing portion that increases a pressure of a mixture of the injected fluid and the suction fluid, wherein the needle includes a tip portion that protrudes from the fluid injection port toward a downstream side of the fluid injection port along a flow direction of the fluid, the nozzle includes a throat portion that reduces a passage cross-sectional area of the fluid passage to be smallest in the fluid passage at the throat portion, and a nozzle-side tapered portion that extends from the throat portion to the fluid injection port and expands the passage cross-sectional area of the fluid passage toward the downstream side in the flow direction of the fluid, the needle is configured to close the fluid passage, in an axial cross section of the ejector along which the central axis extends, lines perpendicular to the central axis are defined as virtual vertical lines, points at which the virtual vertical lines intersect with an outer surface of the needle are defined as needle-side intersection points, points at which the virtual vertical lines intersect with an inner surface of the nozzle-side tapered portion are defined as nozzle-side intersection points, middle points between the needle-side intersection points and the nozzle-side intersection points on the virtual vertical lines are defined as midpoints, and a line passing through the midpoints is defined as an injection-flow center line, wherein in the axial cross section, an injection-flow spread angle formed on the downstream side in the flow direction of the fluid between the central axis and a tangent line of the injection-flow center line at the fluid injection port is 0 or greater, the needle includes a needle-side p located radially inside the nozzle-side tapered portion, and an outline of the needle-side portion is curved convexly along the flow direction of the fluid maximum outer diameter portion of the needle in the axial cross section.

2. The ejector according to claim 1, wherein
the fluid passage of the nozzle includes a pre-injection passage that is defined between the outer surface of the needle and the inner surface of the nozzle-side tapered portion, and
the pre-injection passage has a passage cross-sectional area that increases toward the downstream side along the flow direction of the fluid.

3. The ejector according to claim 1, wherein
the needle-side portion has a cross section that increases toward the downstream side along the flow direction of the fluid.

4. The ejector according to claim 1, wherein
an outline of the nozzle-side tapered portion linearly extends in the axial cross-section.

* * * * *